Patented Oct. 18, 1932

1,883,356

UNITED STATES PATENT OFFICE

GEORGE HOLLAND ELLIS, OF SPONDON, NEAR DERBY, ENGLAND, ASSIGNOR TO CELANESE CORPORATION OF AMERICA, A CORPORATION OF DELAWARE

MANUFACTURE OF AZO DYESTUFFS

No Drawing. Application filed August 2, 1928, Serial No. 297,099, and in Great Birtain August 17, 1927.

This invention relates to the manufacture of new azo dyestuffs and more particularly applicable to materials made of or containing cellulose acetate or other organic esters or ethers of cellulose.

The new azo dyestuffs according to the present invention are prepared by diazotizing an anthraquinone derivative containing a diazotizable amino group and coupling with an amino naphthoic acid or a side-chain or nuclear substitution product thereof.

In producing the new azo dyestuffs the amino-anthraquinone or derivative thereof may be diazotized, for example in solution in strong acids or in aqueous suspension in the presence of mineral acid. The diazo solution obtained may then be diluted if necessary and coupled with the amino naphthoic acid or derivative thereof.

The following examples illustrate the preparation of the new azo dyestuffs of the present invention, but are not to be considered as limiting the invention in any way.

Example 1

44.6 parts of alpha-amino-anthraquinone are dissolved in 450 parts of sulphuric acid and precipitated on to 4000 parts of ice. 15 parts of sodium nitrite, dissolved in cold water, are then added to effect diazotization. The whole is stirred ½ hour cold.

48.8 parts of the hydrochloride of 2-amino-3-naphthoic acid are dissolved in water and the solution of the diazotized amine run in slowly, with stirring, the temperature of coupling being 5–10° C. The requisite quantity of sodium acetate solution is then run in slowly to neutralize mineral acid. Coupling commences immediately, and is complete in about 2 hours. The dyestuff is isolated in the usual manner. It dyes in bluish-red shades and has the probable formula

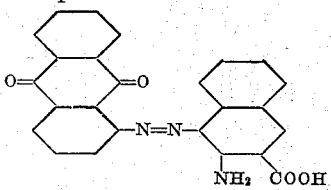

Example 2

56 parts of 1-amino-4-acetylamino-anthraquinone are dissolved in 500 parts of sulphuric acid and then poured on to ice. 15 parts of sodium nitrite, dissolved in cold water are then added, and the whole stirred 30 minutes. The diazo solution is then coupled with 2-amino-3-naphthoic acid in a manner exactly as in Example 1 above. The dyestuff gives red-brown shades and has the probable formula

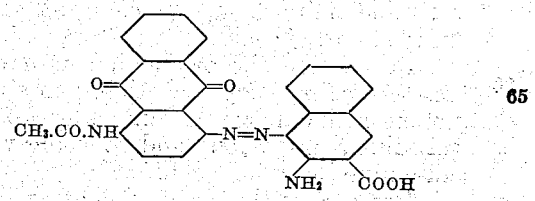

1.4-diamino-anthraquinone monodiazotized and coupled with β-amino-naphthoic acid yields a dyestuff giving red-brown shades while β-amino-anthraquinone with the same coupling component gives a dyestuff yielding orange-red shades.

Instead of 2-amino-3-naphthoic acid used above as the coupling component, other amino naphthoic acids may be employed, for example:—

4-Amino-1-naphthoic acid.
5-Amino-1-naphthoic acid.
8-Amino-1-naphthoic acid.
5-Amino-2-naphthoic acid.
7-Amino-2-naphthoic acid.
8-Amino-2-naphthoic acid.

Furthermore side-chain or nuclear substitution products of aminonaphthoic acids may be employed, for example the N-alkyl substitution products (obtained for instance by treatment of the corresponding hydroxy-naphthoic acids under pressure with alkylamines) or the amino, oxy or halogen substitution products.

Instead of amino anthraquinones, substitution products thereof may be employed, for example alkyl, alkoxy, carboxy, amino, halogen, hydroxy, nitro or acidyl amino nuclear substitution products thereof.

Diaminoanthraquinones may be tetrazotized and coupled with two molecules of an aminonaphthoic acid or substitution product thereof, or with one molecule of an aminonaphthoic acid or substitution product thereof and one molecule of a different coupling component.

What I claim and desire to secure by Letters Patent is:—

1. As new products, azo dyestuffs of the probable formula $R_1(-N=N-R_2)_n$, where $n$ is 1 or 2, $R_1$ an anthraquinone nucleus and at least one $R_2$ is an amino naphthoic acid.

2. As new products, azo dyestuffs of the probable formula $R_1(-N=N-R_2)_n$, where $n$ is 1 or 2, $R_1$ an anthraquinone nucleus and at least one $R_2$ is a beta-amino naphthoic acid.

3. As new products, monazo dyestuffs of the probable formula $R_1-N=N-R_2$, where $R_1$ is an anthraquinone nucleus and $R_2$ is an amino naphthoic acid.

4. As new products, monazo dyestuffs of the probable formula $R_1-N=N-R_2$, where $R_1$ is an anthraquinone nucleus and $R_2$ is a beta-amino naphthoic acid.

5. Process for the production of new azo dyestuffs, comprising diazotizing an anthraquinone compound containing at least one diazotizable amino group and coupling with an amino naphthoic acid.

6. Process for the production of new azo dyestuffs, comprising diazotizing an anthraquinone compound containing at least one diazotizable amino group and coupling with a beta-amino naphthoic acid.

7. Process for the production of new monazo dyestuffs, comprising diazotizing an anthraquinone compound containing at least one diazotizable amino group and coupling with an amino naphthoic acid.

8. Process for the production of new monazo dyestuffs, comprising diazotizing an anthraquinone compound containing at least one diazotizable amino group and coupling with a beta-amino naphthoic acid.

In testimony whereof I have hereunto subscribed my name.

GEORGE HOLLAND ELLIS.